United States Patent
Xu et al.

(10) Patent No.: US 9,219,672 B2
(45) Date of Patent: Dec. 22, 2015

(54) LABEL SWITCHING OR EQUIVALENT NETWORK MULTIPATH TRAFFIC CONTROL

(75) Inventors: Fengman Xu, Allen, TX (US); Khalid Elshatali, Allen, TX (US); Zhongping Pan, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 848 days.

(21) Appl. No.: 13/325,103

(22) Filed: Dec. 14, 2011

(65) Prior Publication Data

US 2013/0155865 A1 Jun. 20, 2013

(51) Int. Cl.
*H04L 12/26* (2006.01)
*H04L 12/729* (2013.01)
*H04L 12/723* (2013.01)
*H04L 12/801* (2013.01)

(52) U.S. Cl.
CPC .......... *H04L 43/0894* (2013.01); *H04L 45/125* (2013.01); *H04L 45/50* (2013.01); *H04L 47/10* (2013.01)

(58) Field of Classification Search
CPC ................ H04L 47/10; H04L 12/5602; H04L 2012/5636; H04L 2012/5632; H04L 43/50; H04L 47/35; H04L 47/30; H04L 47/32

USPC .......... 370/232–234, 253, 289, 392; 709/223, 709/225

See application file for complete search history.

(56) References Cited

U.S. PATENT DOCUMENTS

| | | | |
|---|---|---|---|
| 6,363,319 B1 * | 3/2002 | Hsu ............................... | 701/533 |
| 8,284,665 B1 * | 10/2012 | Aybay et al. .................. | 370/235 |
| 2008/0165685 A1 * | 7/2008 | Weiss et al. .................... | 370/231 |
| 2008/0175269 A1 * | 7/2008 | Alvarez et al. ................ | 370/468 |
| 2009/0193105 A1 * | 7/2009 | Charny et al. ................. | 709/223 |
| 2010/0023634 A1 * | 1/2010 | Labonte et al. ............... | 709/231 |
| 2011/0138463 A1 * | 6/2011 | Kim et al. ........................ | 726/22 |
| 2012/0014282 A1 * | 1/2012 | Pappu et al. .................. | 370/253 |
| 2012/0141345 A1 * | 6/2012 | Slaten ........................... | 423/235 |

* cited by examiner

*Primary Examiner* — Warner Wong

(57) ABSTRACT

A method, a device, and a storage medium provide for receiving packets; determining a traffic flow rate value pertaining to the packets; comparing the traffic flow rate value to a flow rate threshold value; selecting one or more candidate paths that are not bandwidth-aware; calculating a current available bandwidth for each of the one or more candidate paths; selecting one or more of the one or more candidate paths based on the traffic flow rate value and the current available bandwidth; and transmitting the packets to a destination via the one or more of the one or more candidate paths.

20 Claims, 13 Drawing Sheets

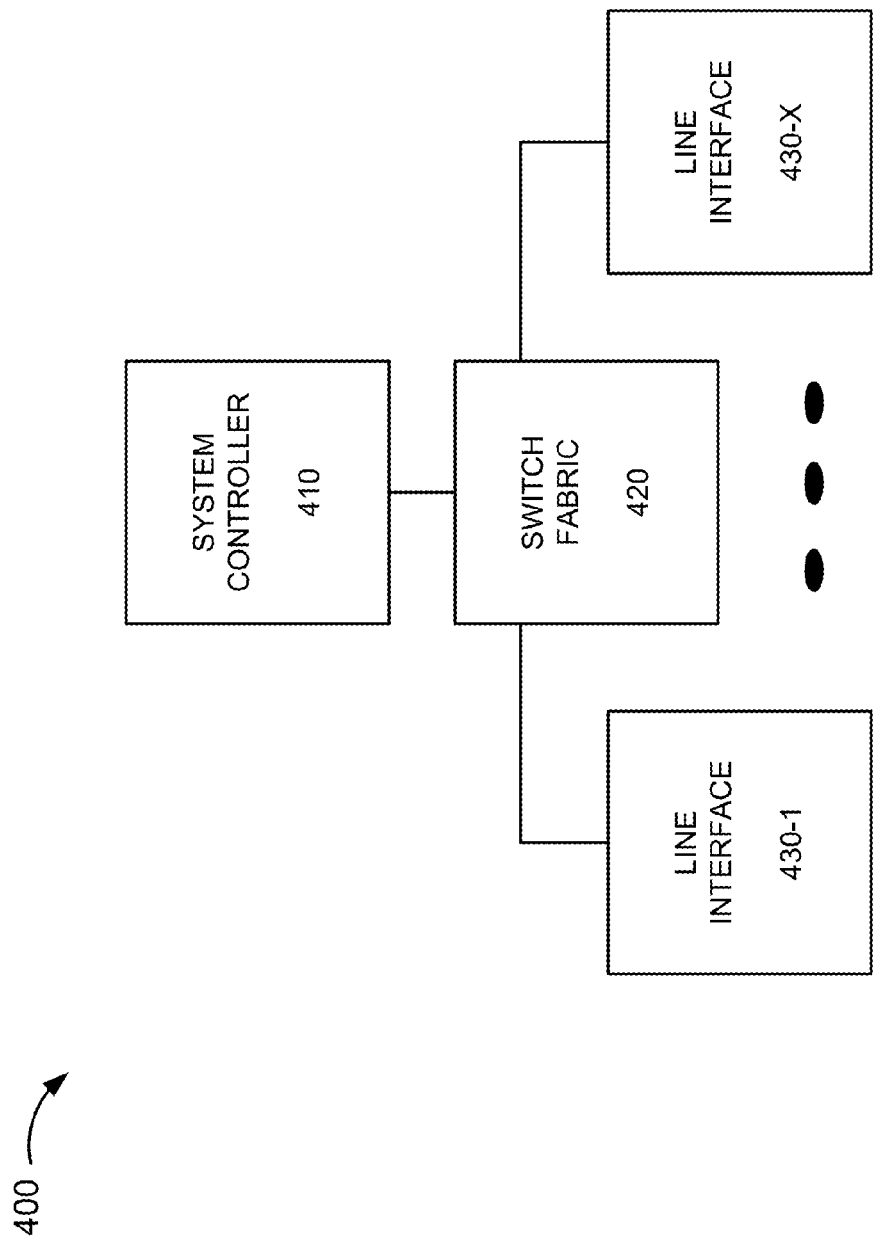

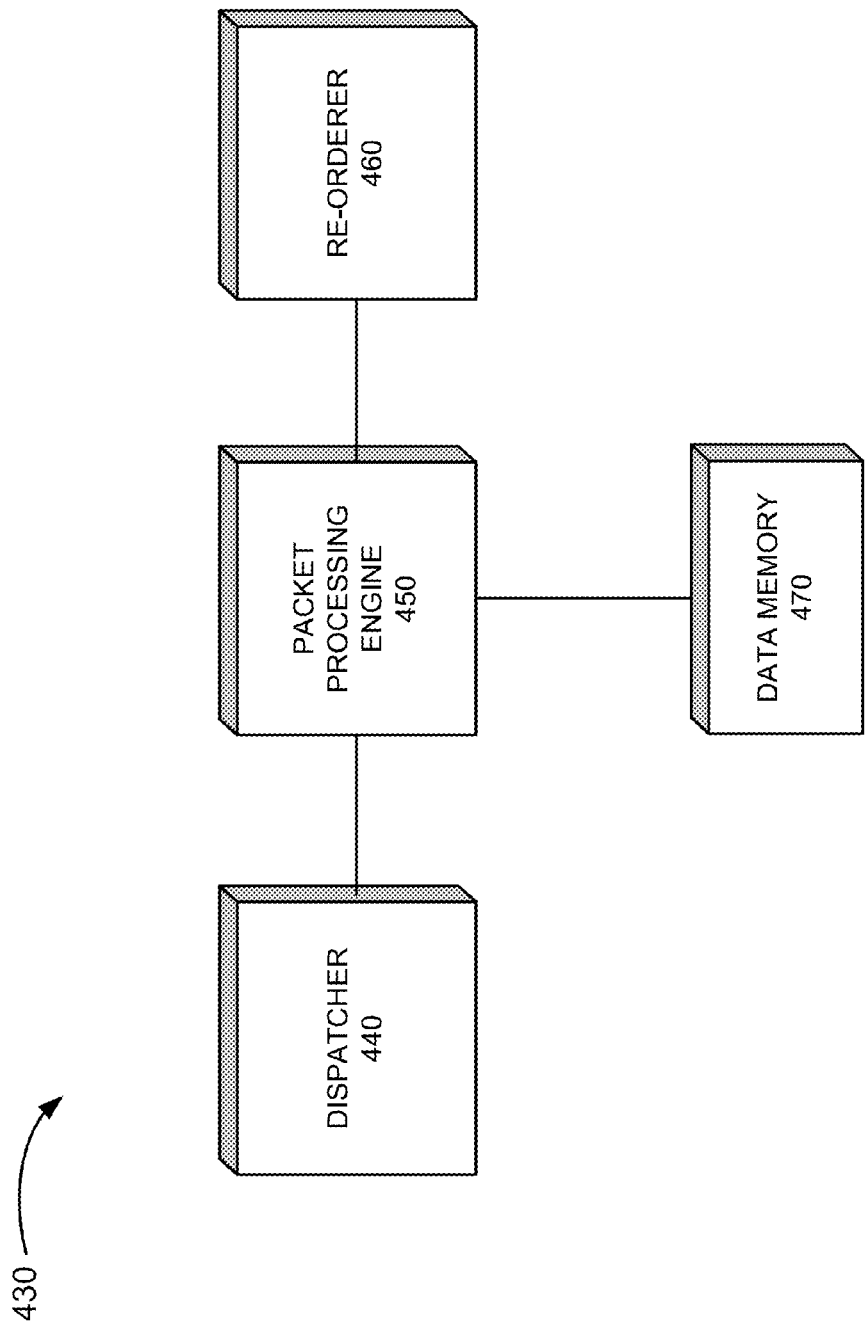

LABEL SWITCHING OR EQUIVALENT NETWORK MULTIPATH TRAFFIC CONTROL

BACKGROUND

In Multiprotocol Label Switching (MPLS)-based networks, such as MPLS-based Virtual Private Networks (VPNs), traffic distribution on multiple paths is managed by having multiple paths equally used for passing traffic to a destination based on a hashing algorithm, a round-robin algorithm, or a random path selection algorithm.

DESCRIPTION OF THE DRAWINGS

FIG. 4A is a diagram illustrating exemplary components of a network device that may correspond to one or more of the devices depicted in the exemplary environment;

FIG. 4B is a diagram illustrating exemplary functional components of a line interface of the network device depicted in FIG. 4A;

DETAILED DESCRIPTION

Figure 1:
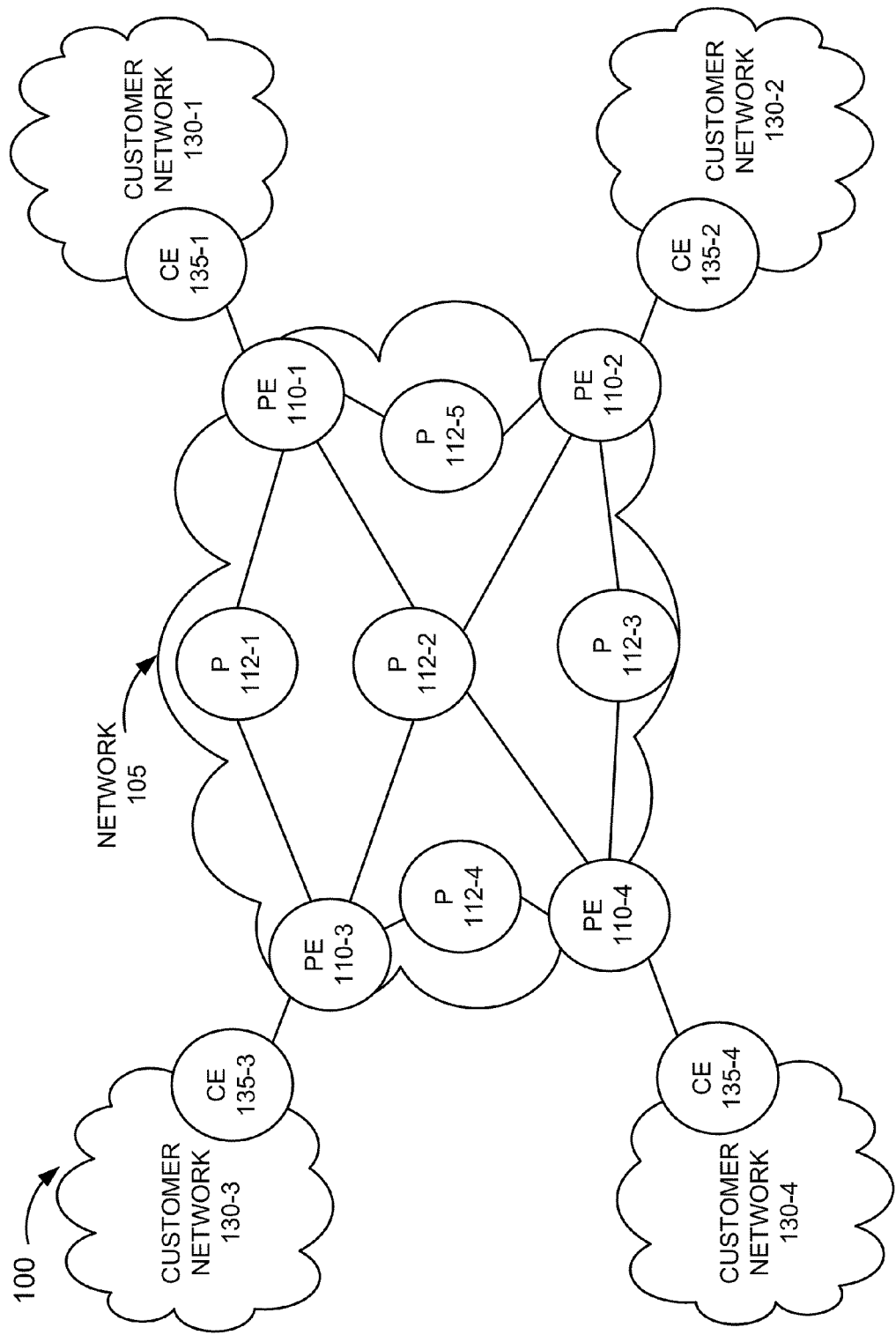
FIG. 1 is a diagram illustrating an exemplary environment in which an exemplary embodiment of an MPLS-based network with traffic flow distribution may be implemented.

The following detailed description refers to the accompanying drawings. The same reference numbers in different drawings may identify the same or similar elements. Also, the following detailed description does not limit the invention.

Traffic distribution on multiple paths of an MPLS-based network is usually managed by having multiple paths equally used. For example, hashing algorithms are widely used today for both flow-based and packet-based traffic distribution schemes. Depending on which routing technique or forwarding technique is implemented, the multiple equivalent paths can be any identical layer 2 path or layer 3 path (e.g., Internet Protocol (IP), MPLS, Private Virtual Circuit (PVC), Pseudo wire (PW), etc.) between two nodes.

According to an exemplary embodiment, the MPLS-based network uses label switching path information, traffic flow information, and a threshold value to assign each traffic flow to an appropriate label switching path.

According to another exemplary embodiment, an MPLS-based network uses label switching path (LSP) information and customer traffic flow information to assign each traffic flow to an appropriate label switching path.

According to an exemplary implementation, the label switching path information includes a maximum bandwidth and a current available bandwidth of a label switching path. According to an exemplary implementation, bandwidth utilization information is obtained from a traffic statistics collection system. A label switching path may be a logical label switching path or a physical label switching path.

According to an exemplary implementation, the customer traffic flow information includes a traffic flow rate pertaining to a traffic flow. The customer traffic flow information may also include a traffic flow size and/or a traffic flow duration. According to an exemplary implementation, the customer traffic flow information is obtained based on the knowledge of a customer's provisioned access speed, a detection of a traffic flow rate, and/or traffic flow characteristic information included in one or more packets that begin a traffic flow. The traffic flow characteristic information may include a name and/or a type of application used by a source device, a source device identifier (e.g., a network address, an equipment identifier), a connection type, a protocol, and/or other types of information to permit traffic flow information to be determined.

While implementations of exemplary embodiments described in this description are described using a particular protocol, communication standard, platform, etc., such implementations of the embodiments are not intended to be restrictive or provide an exhaustive treatment, as such. In other words, the embodiments described herein may be implemented using other suitable protocols, communication standards, platforms, etc., which may not be specifically described. For example, one or more embodiments described herein may be practiced in a Provider Backbone Bridge Traffic Engineering (PBB-TE)-based network, a Generalized MPLS (GMPLS)-based network, or a Q-in-Q-based network.

FIG. 1 is a diagram illustrating an exemplary environment in which an exemplary embodiment of an MPLS-based network with traffic flow distribution may be implemented. As illustrated, environment 100 includes a network 105 that includes provider edge (PE) devices 110-1 through 110-4 (also referred to collectively as provider edge devices 110 and individually as provider edge device 110) and provider (P) devices 112-1 through 112-5 (also referred to collectively as provider devices 112 and individually as provider device 112). Additionally, environment 100 includes customer networks 130-1 through 130-4 (also referred to collectively as customer networks 130 and individually as customer network 130) and customer edge (CE) devices 135-1 through 135-4 (also referred to collectively as customer edge devices 135 and customer edge device 135).

The number of devices and the configuration in environment 100 are exemplary and provided for simplicity. According to other embodiments, environment 100 may include additional devices, fewer devices, different devices, and/or differently arranged devices, than those illustrated in FIG. 1. Additionally, the number and the arrangement of connections between devices are exemplary and provided for simplicity According to other embodiments, a single device in FIG. 1 may be implemented as multiple devices and/or multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 may be implemented to include wired and/or wireless connections among the devices illustrated.

Network 105 includes an MPLS network that provides, for example, pseudo wire (PW) services, virtual private local area network (VLAN) services, layer 2 MPLS virtual private network (VPN) services, and/or layer 3 MPLS VPN services. As described further below, network 105 assigns each traffic flow to an appropriate label switching path based on label switching path utilization (e.g., available bandwidth of a label switching path) and traffic flow information.

According to an exemplary implementation, network 105 includes label switching paths. For example, network 105 includes Label Distribution Protocol (LDP) label switching paths that do not have traffic engineering capabilities. According to another exemplary implementation, network 105 includes label switching paths that have traffic-engineering capabilities. For example, network 105 includes Resource Reservation Protocol (RSVP) or RSVP-Traffic Extension (RSVP-TE) label switching paths that support explicit paths and bandwidth reservation. According to yet another exemplary implementation, network 105 includes stacked label switching paths. For example, network 105 includes an LDP LSP that is stacked over an RSVP LSP or an RSVP-TE LSP. A session on a label switching path may be established among provider edge device(s) 110 and/or provider device(s) 112 that support the LDP and the use of tunneling via RSVP LSP(s) or RSVP-TE LSP(s).

Provider edge device 110 includes a network device that receives and transmits a traffic flow. According to an exemplary embodiment, provider edge device 110 selects label switching paths for traffic flows based on label switching path utilization information and traffic flow information, as described herein. According to an exemplary implementation, provider edge device 110 is a router that routes traffic flows to and from customer network 130 via customer edge device 135. According to another exemplary implementation, provider edge device 110 is a router that routes traffic flows to and from provider devices 110. According to an exemplary implementation, provider edge device 110 performs labeling.

According to an exemplary embodiment, provider edge device 110 determines traffic flow information pertaining to a traffic flow. According to an exemplary embodiment, provider edge device 110 collects statistics associated with traffic flows (e.g., at a per-port level, at a per circuit level, at a per channel level, etc.). Provider edge device 110 calculates label switching path information based on the collected statistics. Provider edge device 110 is described further below.

Provider device 112 includes a network device that receives and transmits a traffic flow. According to an exemplary implementation, provider device 112 is a core or a backbone router in network 105. Customer network 130 includes a network associated with a customer site. Customer edge device 135 includes a network device that receives and transmits a traffic flow. According to an exemplary implementation, customer edge device 135 is a router that routes traffic flows to and from network 105 via provider edge device 110. According to an exemplary implementation, customer edge device 135 is a layer 2 and a layer 3 service-aware device.

Figure 2A:
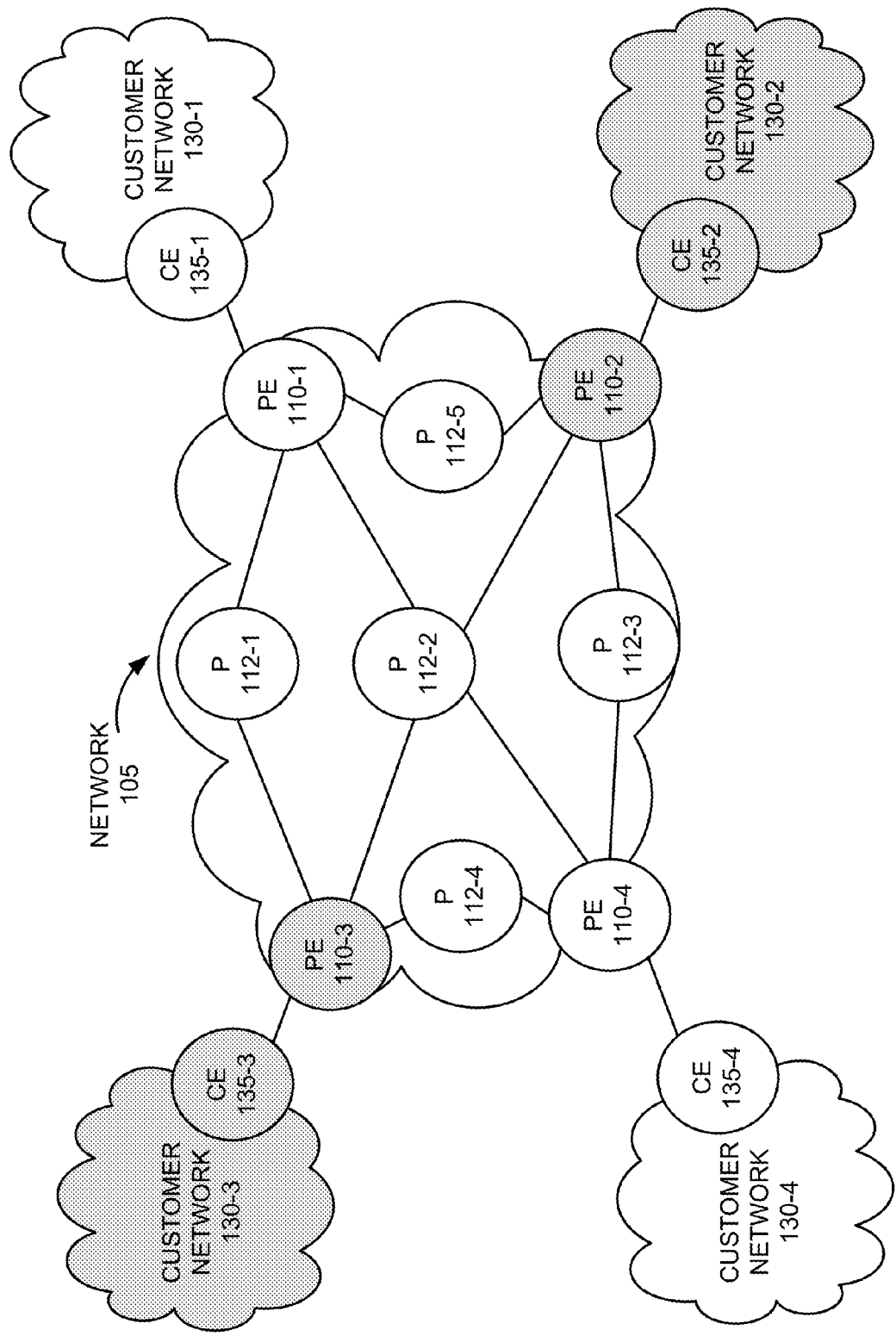
FIGS. 2A-2F illustrate an exemplary process pertaining to traffic flow distribution.

FIGS. 2A-2F illustrate an exemplary process pertaining to traffic flow distribution. It may be assumed that network 105 includes bandwidth-aware label switching paths (e.g., RSVP-LSPs and/or RSVP-TE LSPs). Referring to FIG. 2A, it may be assumed that provider edge device 110-3 receives a traffic flow from customer network 103-3 via customer edge device 135-3. The traffic flow is destined to customer network 130-2 via customer edge device 135-2. The service provider may define a traffic flow relative to provider edge devices 110 based on data/information included in a packet. The term "packet," as used herein, is intended to be broadly interpreted to include a data transmission or communication, the packaging of which may correspond to, for example, a packet, a cell, a frame, a datagram, some other type of container or unit of data, and/or a fragment thereof. The packet may include or be modified to include a label or other suitable field(s) to comply with the communication standard associated with network 105 (e.g., an MPLS network). For example, referring to FIG. 3, a packet 305 may include a network label 310, a virtual private network (VPN) label 315, a customer header 320, and a data field 325. According to other implementations, packet 305 may include additional, fewer, and/or different field(s) or section(s).

Network label 310 includes an MPLS label (e.g., sometimes referred to as an outer label). For example, network label 310 may identify the segment(s) of a label switching path between an ingress provider edge device 110 and an egress provider edge device 110. Virtual private network label 315 includes a label to distinguish between VPNs (e.g., sometimes referred to as an inner label). For example, virtual private network label 315 may include forwarding information (e.g., an egress provider edge device's outgoing interface for the packet, a virtual circuit identifier, a quality of service value(s), etc.). Additionally, or alternatively, virtual private network label 315 may include, for example, an identifier (e.g., a string) that identifies a customer's VPN. Customer header 320 includes source and destination addresses (e.g., IP addresses), and data field 325 includes data. According to an exemplary implementation, provider edge device 110 may define a traffic flow based on packets that have the same network label 310, VPN label 315, customer header 320, and/or a portion of data/information included therein.

Figure 2B:
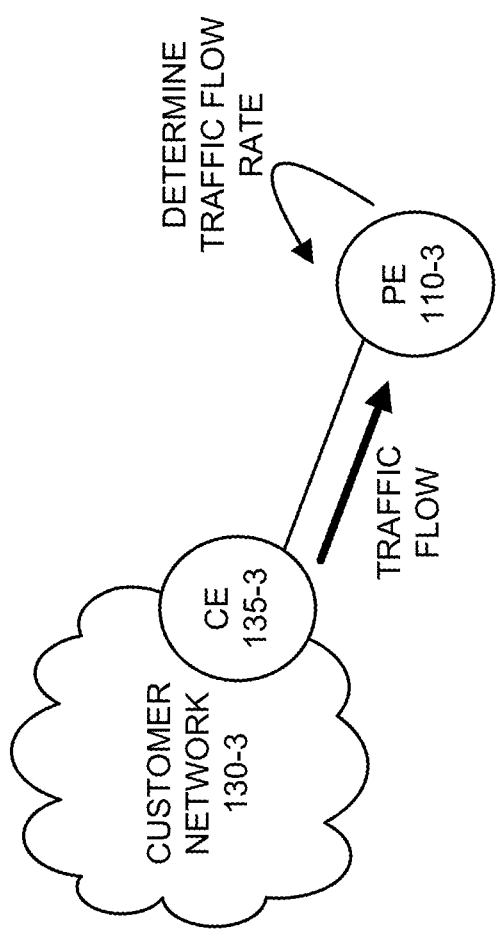
Figure 3:
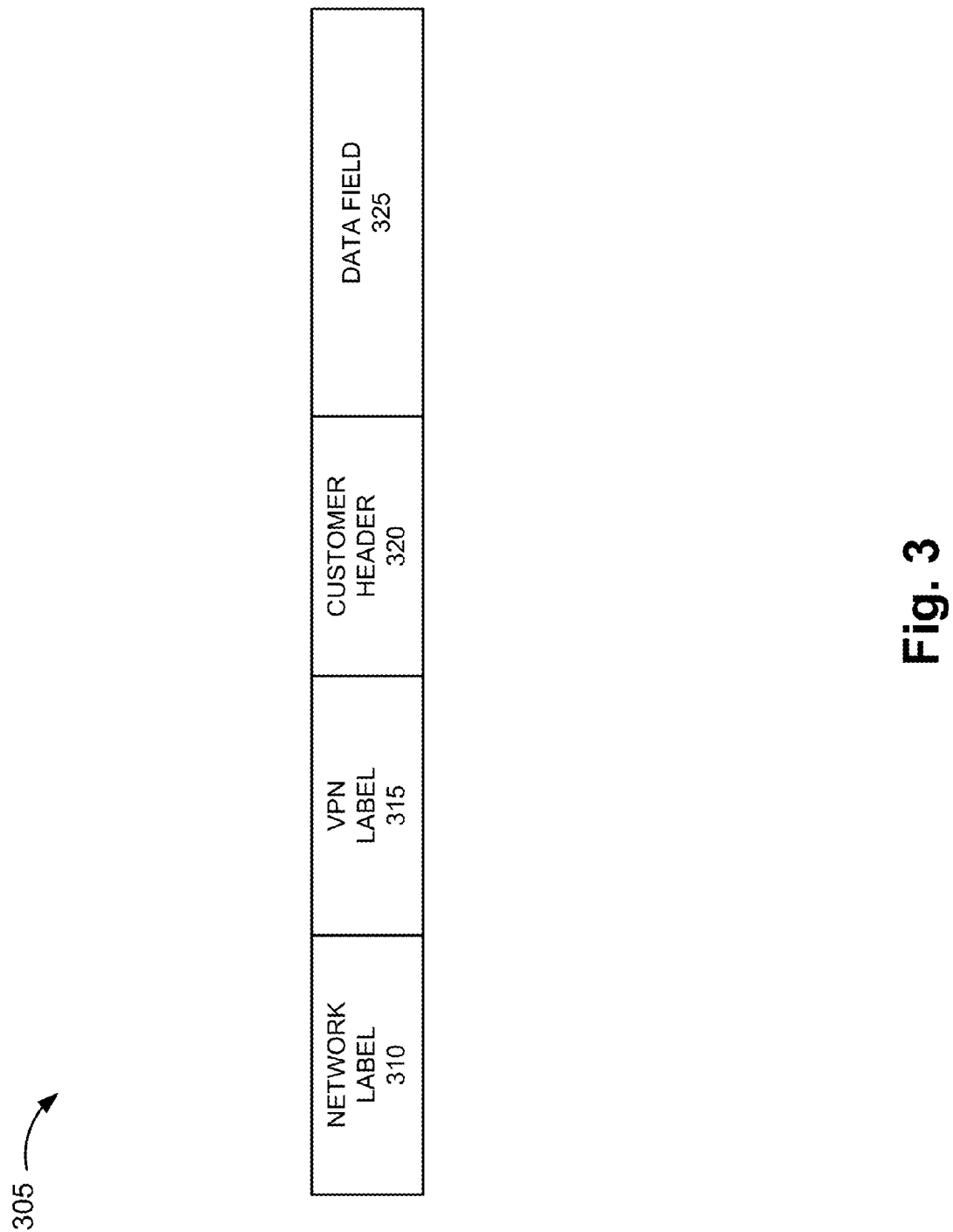
FIG. 3 is a diagram illustrating an exemplary packet format.

According to an exemplary embodiment, as illustrated in FIG. 2B, provider edge device 110-3 determines a traffic flow rate associated with the traffic flow from customer network 130-3 via customer edge device 135-3. According to an exemplary implementation, provider edge device 110-3 determines the traffic flow rate based on knowledge of the customer's provisioned access. For example, the customer access to provider edge device 110-3 may be a particular bit rate (e.g., 5 Gigabits/second, 10 Gigabits/second, 1 Gigabit/second, etc.).

According to another exemplary implementation, provider edge device 110-3 determines the traffic flow rate associated with the traffic flow based on a buffer system and/or a counter system. For example, a buffer system (e.g., an inbound buffer system) receives incoming packets from customer edge device 135-3. The buffer system counts the bits/bytes over a time period to calculate or identify a traffic flow rate.

According to another exemplary implementation, provider edge device 110-3 determines the traffic flow rate based on data included in one or more packets (e.g., beginning packets) of the traffic flow. For example, with reference to an Internet Protocol (IP) version 4 packet, an options field may include traffic flow characteristic information. Alternatively, with reference to an IP version 6 packet, an extension header field may include traffic flow characteristic information. As previously described, the traffic flow characteristic information may include the name and/or the type of application, the protocol used, a source device identifier (e.g., a network address, equipment identifier), a connection type, etc. According to an exemplary implementation, provider edge device 110-3 or another device stores a database or a data structure that maps traffic flow characteristic information to a particular traffic flow rate. According to another exemplary implementation, provider edge device 110-3 may derive the traffic flow rate using other methods. For example, the connection type may indicate a particular bandwidth that may be used to determine a traffic flow rate.

Figure 2C:
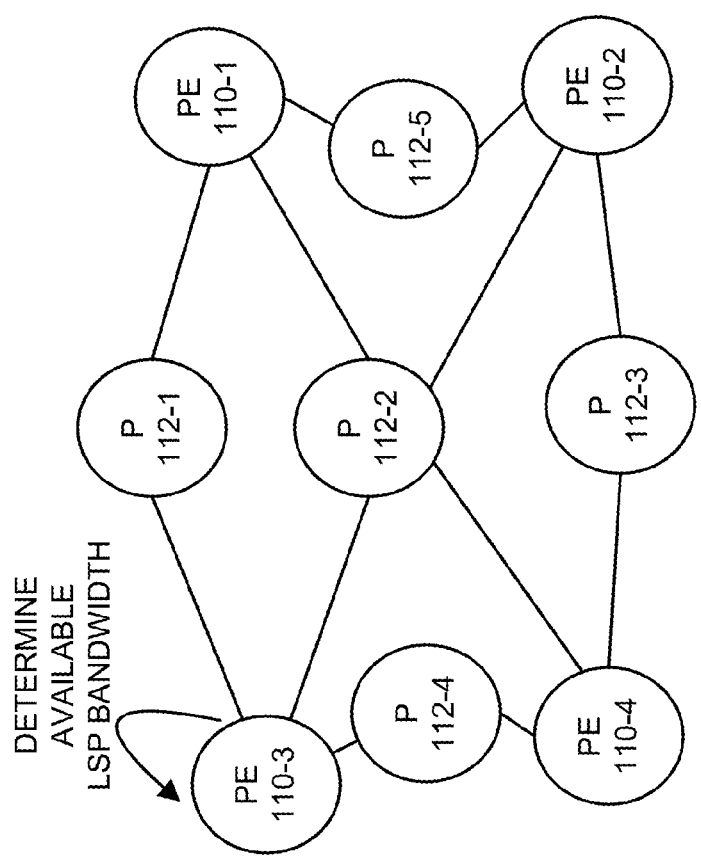

Referring to FIG. 2C, provider edge device 110-3 determines the current available bandwidth of candidate label switching path(s) that provide a path to customer network 130 destination (e.g., customer network 130-2). According to an exemplary implementation, provider edge device 110-3 has knowledge of the maximum bandwidth for a label switching path. For example, the maximum bandwidth corresponds to the total bandwidth of a label switching path (e.g., without traffic flows).

Provider edge device 110-3 calculates a current bandwidth utilization of a candidate label switching path. For example, provider edge device 110-3 collects statistical information pertaining to the current traffic flow(s) using a candidate label switching path. The statistical information includes or allows provider edge device 110-3 to derive a current bandwidth utilization. By way of example, provider edge device 110-3 samples for a time period (e.g., t0 to t1) the number of bits or bytes transmitted via one or more interfaces. Provider edge device 110-3 calculates a current available bandwidth based on the maximum bandwidth and the current bandwidth utilization for the candidate label switching path (e.g., by calculating a difference between these bandwidth values).

Figure 2D:
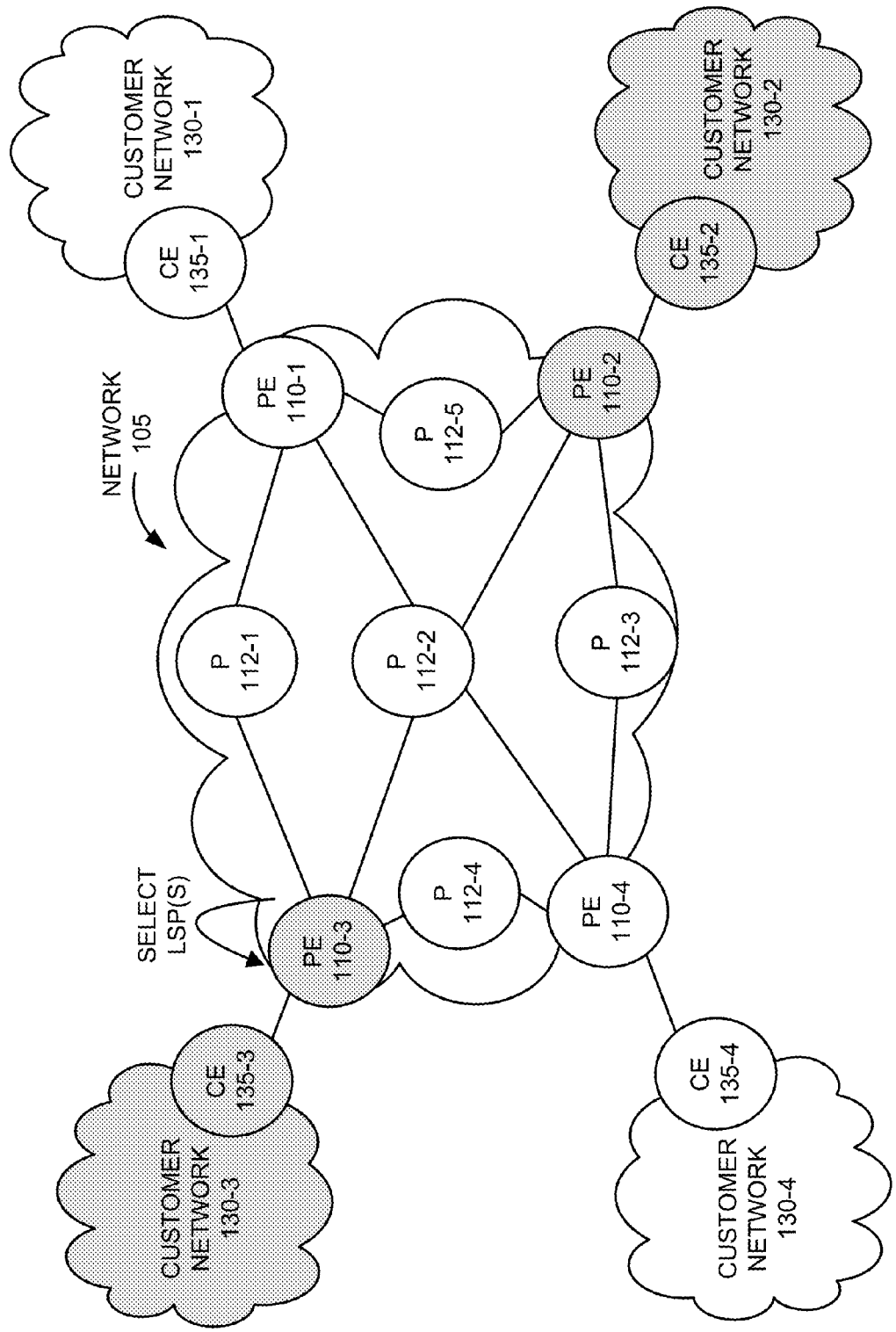

Referring to FIG. 2D, provider edge device 110-3 selects one or multiple label switching paths based on the traffic flow information (e.g., a traffic flow rate) and the current available bandwidth associated with one or more candidate label switching paths. According to an exemplary embodiment, provider edge device 110-3 also uses one or multiple threshold values to select one or more candidate label switching paths to service the traffic flow, as described further below.

According to an exemplary implementation, a threshold value includes a flow rate threshold value. The flow rate threshold value may be calculated based on historical statistical data pertaining to customer traffic flows. The historical statistical data may represent customer traffic flow behavior over a short time period (e.g., a day, an hour, etc.) or a long time period (e.g., a week, a month, etc.). The flow rate threshold value permits provider edge device 110-3 to select one or more candidate label switching paths from a group of label switching paths that are able to satisfy the bandwidth demands associated with the traffic flow.

According to an exemplary implementation, the flow rate threshold value is a static value. According to another exemplary implementation, the flow rate threshold value is a dynamic value. For example, the flow rate threshold value may change based on a time parameter and/or one or multiple network state parameters (e.g., congestion, throughput, etc.).

As previously described, according to an exemplary embodiment, provider edge device 110-3 uses a threshold value to select one or more candidate label switching paths to service the traffic flow. According to an exemplary implementation, provider edge device 110-3 compares a traffic flow rate associated with the traffic flow to a flow rate threshold value. Based on a result of the comparison, provider edge device 110-3 selects one or multiple candidate label switching paths.

Figure 2E:
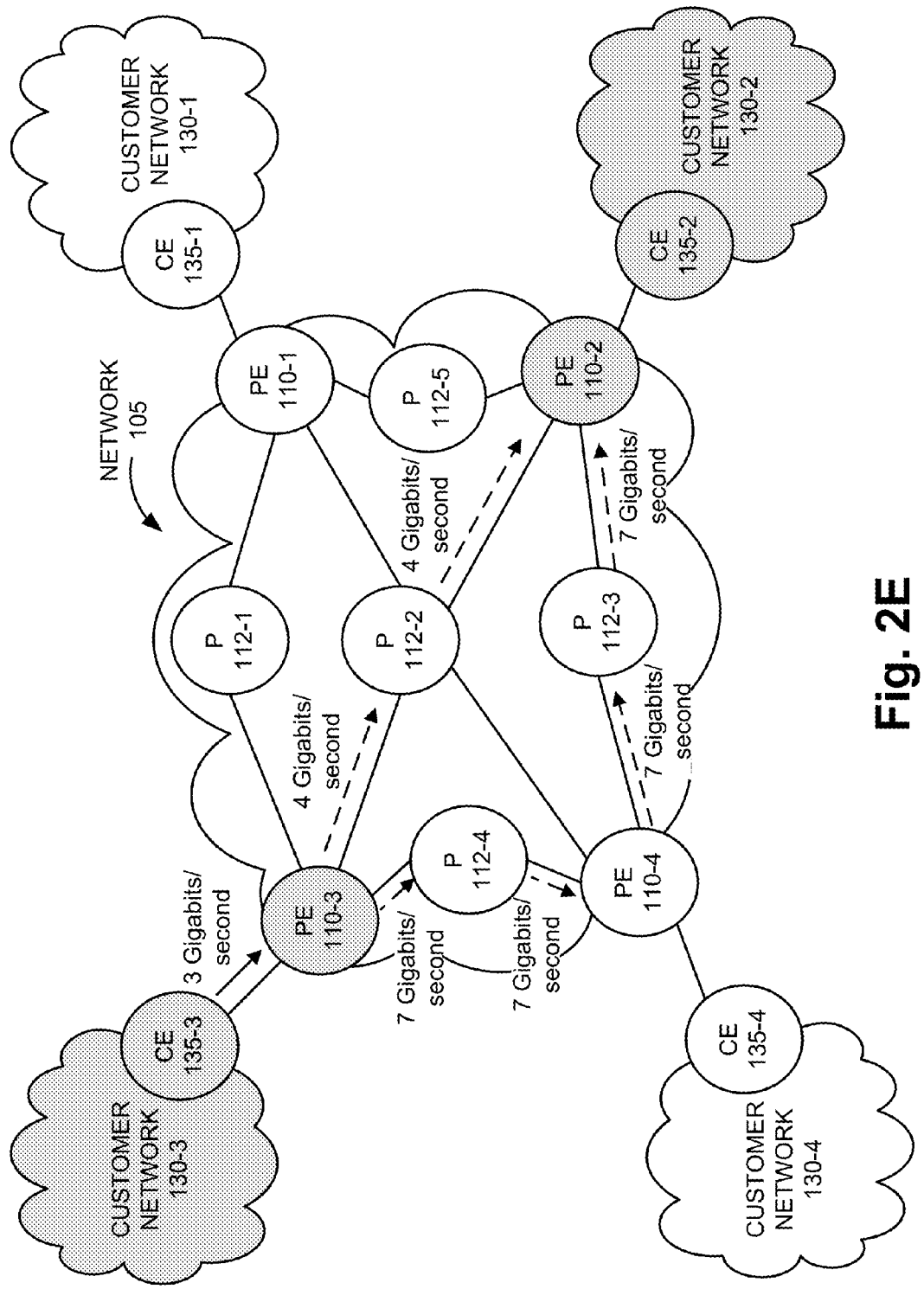

Referring to FIG. 2E, by way of example, assume that the traffic flow rate is 3 Gigabits/second and the flow rate threshold value is 4 Gigabits/second. According to this exemplary scenario, provider edge device 110-3 identifies two candidate label switching paths. The two candidate label switching paths are LDP label switching paths. The first candidate label switching path is from provider edge device 110-3 to provider device 112-2 to provider edge device 110-2. The second candidate label switching path is from provider edge device 110-3 to provider device 112-4 to provider edge device 110-4 to provider device 112-3 to provider edge device 110-2. Provider edge device 110-3 calculated that the first candidate label switching path has 4 Gigabits/second available bandwidth and the second candidate label switching path has 7 Gigabits/second available bandwidth. According to this scenario, the first candidate label switching path or the second candidate label switching path could be used to satisfy the 3 Gigabits/second traffic flow demand.

According to an exemplary implementation, based on the comparison between the traffic flow rate (e.g., 3 Gigabits/second) to the flow rate threshold value (e.g., 4 Gigabits/second), provider edge device 110-3 selects the first candidate label switching path. For example, since the traffic flow rate is below the flow rate threshold value, provider edge device 110-3 selects a candidate label switching path that has the least-free available bandwidth (e.g., the first candidate label switching path). According to such an implementation, if the traffic flow rate is above the flow rate threshold value, provider edge device 110-3 selects the candidate label switching path that has the most-free available bandwidth (e.g., the second candidate label switching path).

Figure 2F:
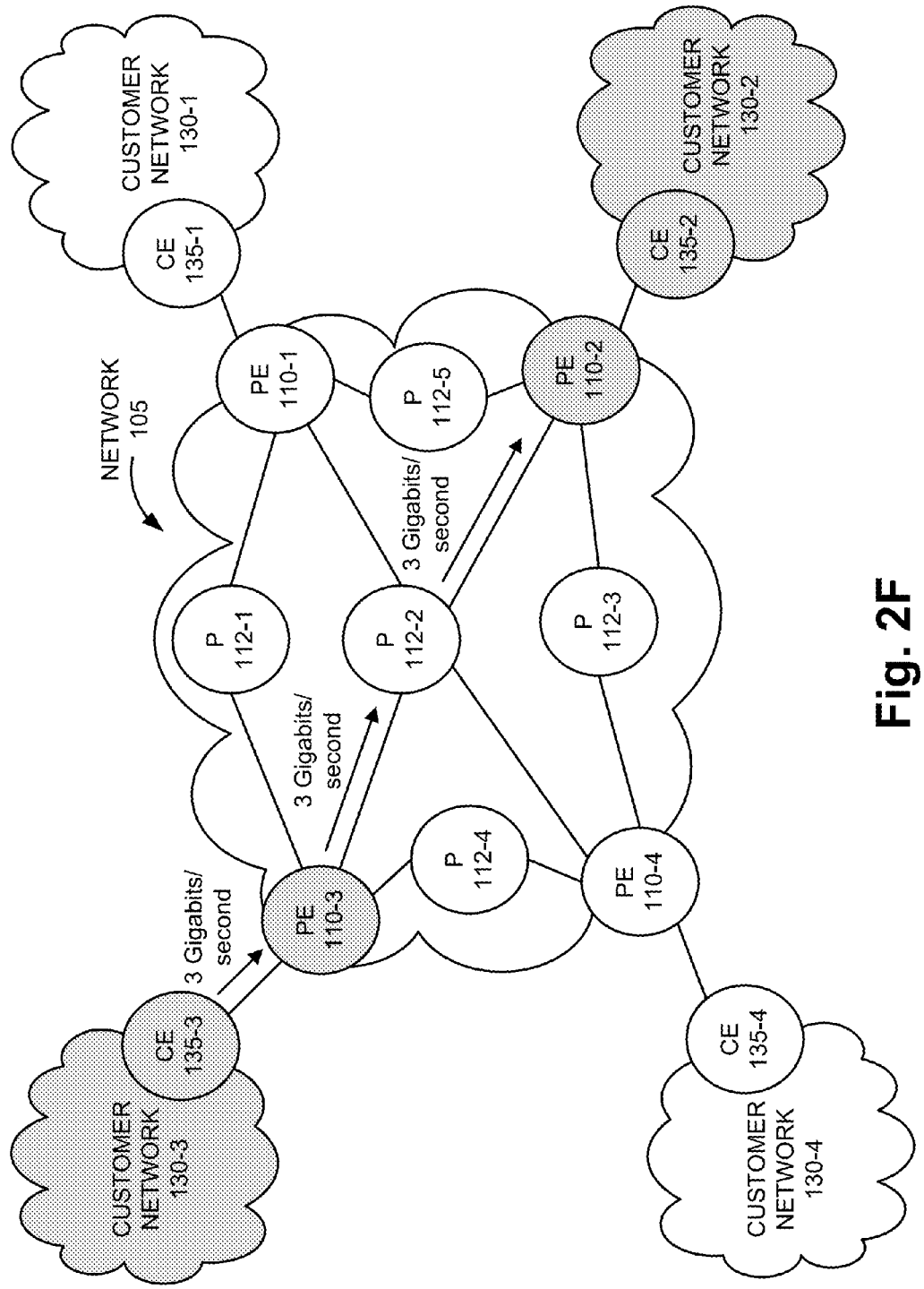

Continuing this scenario and referring to FIG. 2F, provider edge device 110-3 transmits the traffic flow to customer network 130-2 using the first candidate label switching path. Subsequently, provider edge device 110-3 receives another traffic flow having a traffic flow rate of 6.5 Gigabits. Assume the second candidate label switching path is still available and offers a 7 Gigabits/second bandwidth. Provider edge device 110-3 selects the second candidate label switching path for servicing the customer demand.

According to this scenario, the flow rate threshold value served as a basis for preserving the second candidate label switching path for higher bandwidth traffic demands. In some circumstances, such an approach prevents a customer having a traffic flow with low bandwidth demand being serviced by a label switching path having a relatively higher available bandwidth. Stated conversely, such an approach prevents a customer having a traffic flow with high bandwidth demand being serviced by a label switching path having a relatively lower available bandwidth and/or using multiple label switching paths, which may negatively impact network performance (e.g., network resource usage using multiple label switching paths, etc.).

The flow rate threshold value may be calculated based on historical data pertaining to traffic flows. For example, the flow rate threshold value may be calculated based on a polling of real-time traffic flow volume over the LSP(s) and the total configured bandwidth for those LSP(s). Additionally, or alternatively, the flow rate threshold value may be calculated based on the traffic flow to be routed. For example, the traffic flow may include traffic flow information, such as traffic flow size, in which the size of a file (e.g., 3 Gigabits) is indicated in a packet associated with the traffic flow. Additionally, provider edge device 110 may calculate other traffic flow information (e.g., traffic flow rate, traffic flow duration) for use in calculating the flow rate threshold value. The flow rate threshold value may be expressed in terms of, for example, bits/time period (e.g., second, minute, etc.) or as a percentage of the total configured bandwidth. As previously described, the flow rate threshold value may be a static value or a dynamic value.

FIG. 4A is a diagram illustrating exemplary components of a network device 400 that may correspond to one or more of the devices in environment 100. As illustrated, network device 400 includes a system controller 410, a switch fabric 420, and line interfaces 430-1 through 430-X, in which X>1 (also referred to collectively as line interfaces 430 or individually as line interface 430). According to other embodiments, device 400 may include fewer components, additional components, different components, and/or a different arrangement of components than those illustrated in FIG. 4 and described herein.

System controller 410 includes one or multiple processors, microprocessors, application specific integrated circuits (ASICs), field programming gate arrays (FPGAs), and/or processing logic that may be optimized for networking and communications. System controller 410 may also include one or more static memories (e.g. read only memory (ROM)(s)), one or more dynamic memories (e.g. random access memory (RAM)(s)), one or more onboard cache(s), and/or flash memory(s) for storing data and/or machine-readable instructions.

System controller 410 may perform high level management functions for network device 400. For example, system controller 410 may communicate with other networks, devices, and/or systems connected to network device 400 to exchange information regarding network topology. System controller 410 may include a routing engine.

Switch fabric 420 include one or multiple switching planes to facilitate communication among line interfaces 430 and/or system controller 410. According to an exemplary implementation, a switching plane includes a single-stage switch or a multi-stage switch of crossbar elements. Switch fabric 420 may also, or alternatively, include one or more processors, one or more memories, and/or one or more paths that permit communication among system controller 410 and line interfaces 430.

Line interfaces 430 include devices or components, such as, for example, line cards, for receiving incoming packets from network links (or from other line interfaces 430) and for transmitting packets to network links (or to other line interfaces 430). Line interfaces 430 manage a set of input ports via which packets may be received and a set of output ports via which packets may be transmitted. Line interfaces 430 may include one or more processors, one or more memories, and/or other forms of logic and/or hardware.

According to an exemplary embodiment, network device 400 performs traffic flow distribution processes pertaining to routing and/or switching of traffic flows, as described herein. According to an exemplary implementation, network device 400 performs one or more operations of a process in response to system controller 410 and/or line interface(s) 430 executing instructions (e.g., software, microinstructions, etc.). Alternatively, according to another exemplary implementation, network device 400 performs one or more operations of a process based on hardware processing.

FIG. 4B is a diagram illustrating exemplary functional components of line interface 430 depicted in FIG. 4A. The functional components illustrated in FIG. 4B may be implemented by hardware (e.g., one or more processors or other processing logic) or a combination of hardware and software. As illustrated, line interface 430 may include a dispatcher 440, a packet processing engine (PPE) 450, a re-orderer 460, and a data memory 470.

Dispatcher 440 may serve packets to packet processing engine 450. Dispatcher 440 may store the packets in a memory associated with packet processing engine 450. Dispatcher 440 may receive an indication (e.g., a signal) from re-orderer 460 that packets have been processed by packet processing engine 450. Dispatcher 440 may re-utilize resources for other incoming packets based on this indication.

Packet processing engine 450 may provide for input processing, route lookup, and output processing of packets. Packet processing engine 450 may use data memory 470 to perform routing lookups, classification of packets (e.g., for security purposes), policy-based routing, quality of service (QoS) routing, filtering of packets, and other forms of packet processing (e.g., packet statistical processing, accounting, and/or encapsulation). Packet processing engine 450 may perform one or more packet processing operations (e.g., packet parsing, route lookup, packet rewriting, and/or firewall determinations, etc.) based on microinstructions. The microinstructions may be generated by compiling source code for an application or part of an operating system (OS), such as, for example, Juniper Operating System (JUNOS), Cisco Internet Operating System (IOS), etc. Packet processing engine 450 may execute the microinstructions in one or more processes or threads.

Re-orderer 460 may retrieve packets from a memory associated with packet processing engine 450 when packet processing engine processes are completed. Re-orderer 460 may manage the order of the packets when the packets are associated with a same traffic flow. Re-orderer 460 may pass the packets for output by network device 400.

Data memory 470 may store various types of data related to packet processing. For example, data memory 470 may store a forwarding information base (FIB), routing policies, queueing, etc.

Although FIG. 4B illustrates exemplary functional components of an exemplary line interface 430, according to other implementations, line interface 430 may include fewer functional components, additional functional components, and/or different functional components than those depicted in FIG. 4B and described herein. Additionally, or alternatively, one or more functional components of line interface 430 may perform one or more other tasks described as being performed by one or more other functional components of line interface 430. Additionally, dispatcher 440, packet processing engine 450, re-orderer 460, and/or data memory 470 may be implemented in a component other than line interface 430.

Figure 5:
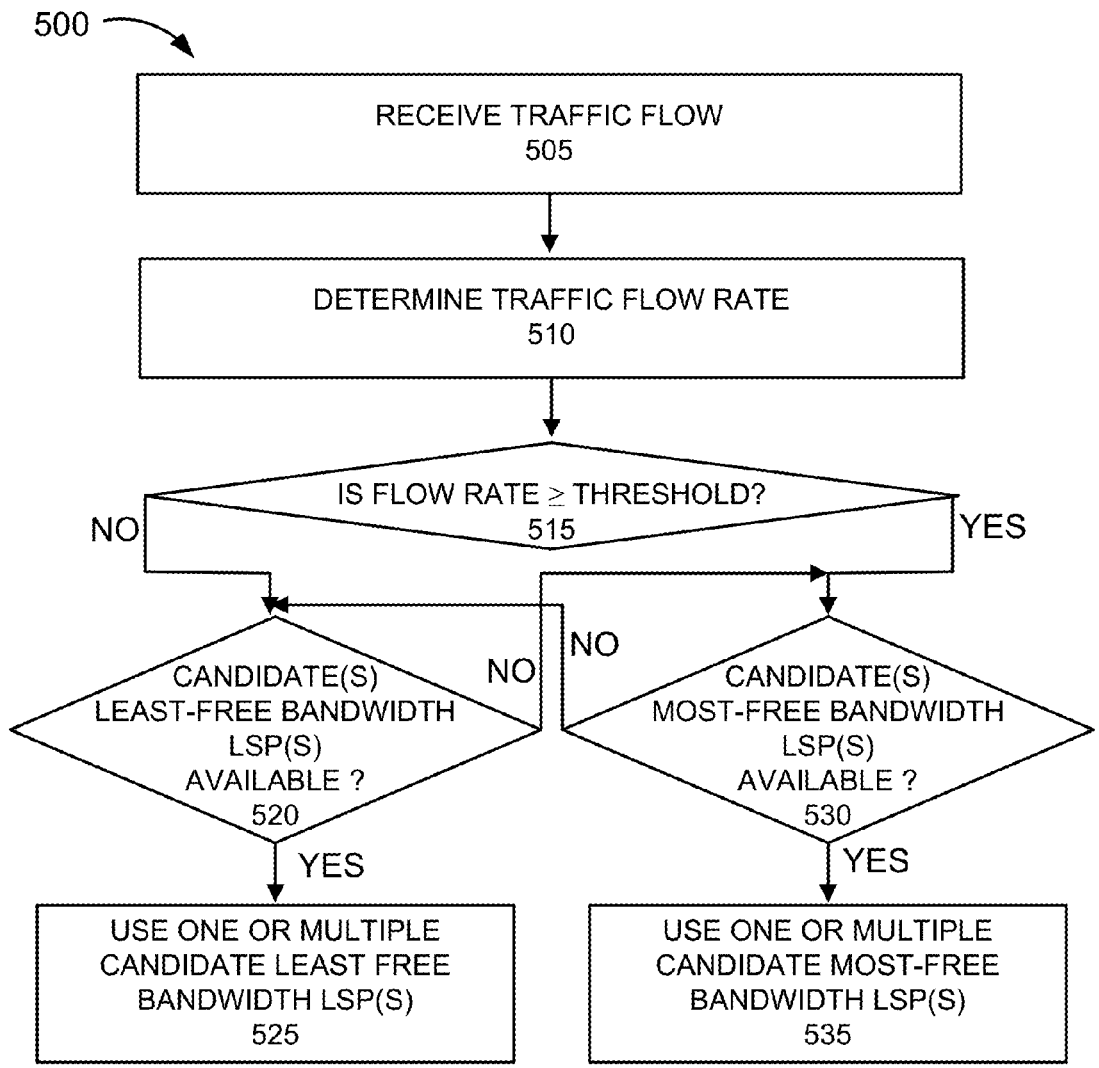
FIG. 5 is a flow diagram illustrating an exemplary process pertaining to an exemplary embodiment of traffic flow distribution.

FIG. 5 is a flow diagram illustrating an exemplary process 500 pertaining to an exemplary embodiment of traffic flow distribution. According to an exemplary embodiment, provider edge device 110 performs process 500. For example, system controller 410 and/or line interface 430 execute(s) one or more of the steps described. Additionally, according to an exemplary embodiment, provider edge device 110 performs process 500 in relation to non-bandwidth-aware label switching paths (e.g., LDP label switching paths).

Process 500 begins with receiving a traffic flow (block 505). For example, provider edge device 110 receives a traffic flow from customer edge device 135. As previously described, provider edge device 110 may define a traffic flow based on data/information included in one or more packets. Provider edge device 110 may identify any incoming packet(s) received as starting, belonging to, etc., a traffic flow.

In block 510, a traffic flow rate of the traffic flow is determined. For example, as previously described, provider edge device 110 may determine the traffic flow rate based on the customer's provisioned access, a buffer system and/or a counter system, or traffic flow characteristic information included in one or multiple beginning packets of the traffic flow.

In block 515, it is determined whether the traffic flow rate is greater than or equal to a flow rate threshold value. For example, provider edge device 110 compares the traffic flow rate of the traffic flow to the flow rate threshold value. As previously described, the flow rate threshold value may be a static value or a dynamic value. Also, the flow rate threshold value is calculated based on historical statistical data pertaining to customer traffic flows.

If it is determined that the traffic flow rate is below the flow rate threshold (block 515—NO), it is determined whether there is/are any candidate least-free bandwidth label switching path(s) available (block 520). For example, as previously described, provider edge device 110 identifies candidate label switching paths and calculates a current available bandwidth based on each candidate label switching path's maximum bandwidth and current bandwidth utilization.

Figure 6:
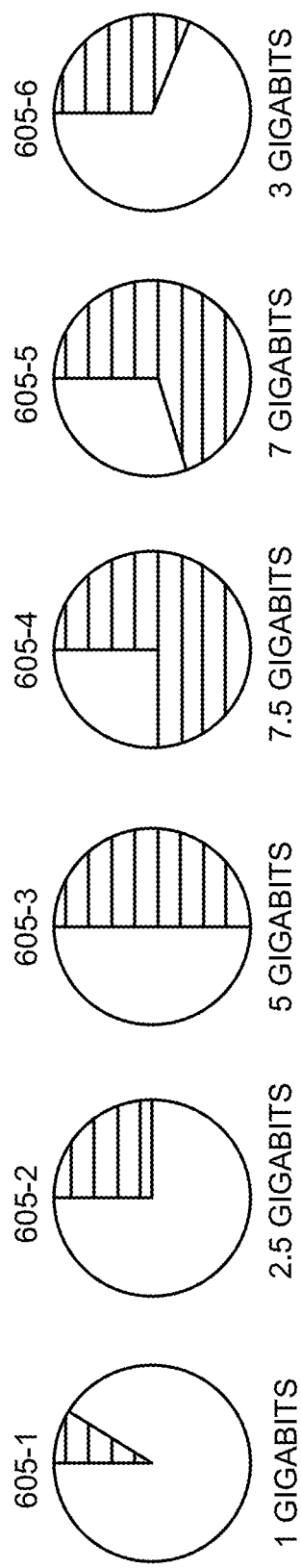
FIG. 6 is a diagram illustrating exemplary available bandwidth values pertaining to label switching paths.

According to an exemplary implementation, a candidate label switching path is deemed a least-free bandwidth label switching path if the current available label bandwidth value is less than the flow rate threshold value. As an example, referring to FIG. 6, assume that the traffic flow rate is 4 Gigabits and the flow rate threshold value is 5 Gigabits. According to such circumstances, the traffic flow rate is below the flow rate threshold value. Also assume that provider edge device 110 has label switching paths 605-1 through 605-6 as candidate label switching paths in which label switching path 605-1 has an available bandwidth of 1 Gigabits, label switching path 605-2 has an available bandwidth of 2.5 Gigabits, label switching path 605-3 has an available bandwidth of 5 Gigabits, label switching path 605-4 has an available bandwidth of 7.5 Gigabits, label switching path has an available bandwidth of 7 Gigabits, and label switching path candidate label switching path 605-6 has an available bandwidth of 3 Gigabits. According to such an exemplary implementation, provider edge device 110 determines that label switching path 605-1, label switching path 605-2, and label switching path 605-6 are least-free bandwidth label switching paths.

According to another implementation, a label switching path is deemed a least-free bandwidth label switching path according to other criterion. For example, a comparison between available bandwidths among label switching paths may serve as a basis for determining whether a label switching path is a least-free bandwidth label switching path, without regard to the flow rate threshold value.

Referring back to FIG. 5, if it is determined that there is/are candidate least-free bandwidth label switching path(s) available (block 520—YES), then one or multiple candidate least-free bandwidth label switching path(s) is/are used to service the traffic flow (block 525). For example, if there is/are candidate least-free bandwidth label switching path(s) available, then provider edge device 110 uses the label switching path(s) to service the traffic flow.

If it is determined that there are no or insufficient candidate least-free bandwidth label switching path(s) available (block 525—NO), then process 500 continues to block 530. For example, if there is no candidate label switching path, provider edge device 110 may use most-free bandwidth label switching path(s). Alternatively, if there is at least one candidate label switching path, but the current available bandwidth is insufficient to service the traffic flow demand, provider edge device 110 may also use a most-free bandwidth label switching path(s).

Referring back to block 515, if it is determined that the traffic flow rate is equal to or above the flow rate threshold (block 515—YES), it is determined whether there is/are any candidate most-free bandwidth label switching path(s) available (block 530). For example, as previously described, provider edge device 110 identifies candidate label switching paths and calculates a current available bandwidth based on each candidate label switching path's maximum bandwidth and current bandwidth utilization.

According to an exemplary implementation, a candidate label switching path is deemed a most-free bandwidth label switching path if the current available bandwidth value is equal to or greater than the flow rate threshold value. As an example, assume that the traffic flow rate is 6 Gigabits and the flow rate threshold is 5.8 Gigabits. According to such circumstances, the traffic flow rate is above the flow rate threshold value. Referring back to FIG. 6 and according to an exemplary implementation, provider edge device 110 determines that label switching path 605-4 and label switching path 605-5 are most-free bandwidth label switching paths.

According to another implementation, a label switching path is deemed a most-free bandwidth label switching path according to other criterion. For example, a comparison between available bandwidths among label switching paths may serve as a basis for determining whether the label switching path is a most-free bandwidth label switching path, without regard to the flow rate threshold value.

Referring back to FIG. 5, if it is determined that there is/are candidate most-free bandwidth label switching path(s) available (block 530—YES), then one or multiple candidate least-free bandwidth label switching path(s) is/are used to service the traffic flow (block 535). For example, if there is/are candidate least-free bandwidth label switching path(s) available, then provider edge device 110 uses the label switching path(s) to service the traffic flow.

If it is determined that there is/are no or insufficient candidate least-free bandwidth label switching path(s) available (block 530—NO), then process 500 continues to block 520. For example, if there is no candidate label switching path, provider edge device 110 may use least-free bandwidth label switching path(s). Alternatively, if there is at least one candidate label switching path, but the current available bandwidth is insufficient to service the traffic flow demand, provider edge device 110 may also use least-free bandwidth label switching path(s). This may occur, for example, when the available bandwidth is very close to the demand and a traffic flow policy does not permit maximum utilization of a label switching path.

Although FIG. 5 illustrates an exemplary process 500 for providing traffic flow distribution, according to other embodiments, process 500 may include additional operations, fewer operations, and/or different operations than those illustrated in FIG. 5 and described herein. By way of example, according to other embodiments, process 500 may not include block 515. For example, provider edge device 110 may select label switching path(s) to service a customer traffic flow based on traffic flow information (e.g., a traffic flow rate) and current available bandwidth associated with the candidate label switching path(s). Additionally, or alternatively, provider edge device 110 may select label switching path(s) based on network state information, service level agreement information, and other well-known or conventional criteria.

Figure 7:
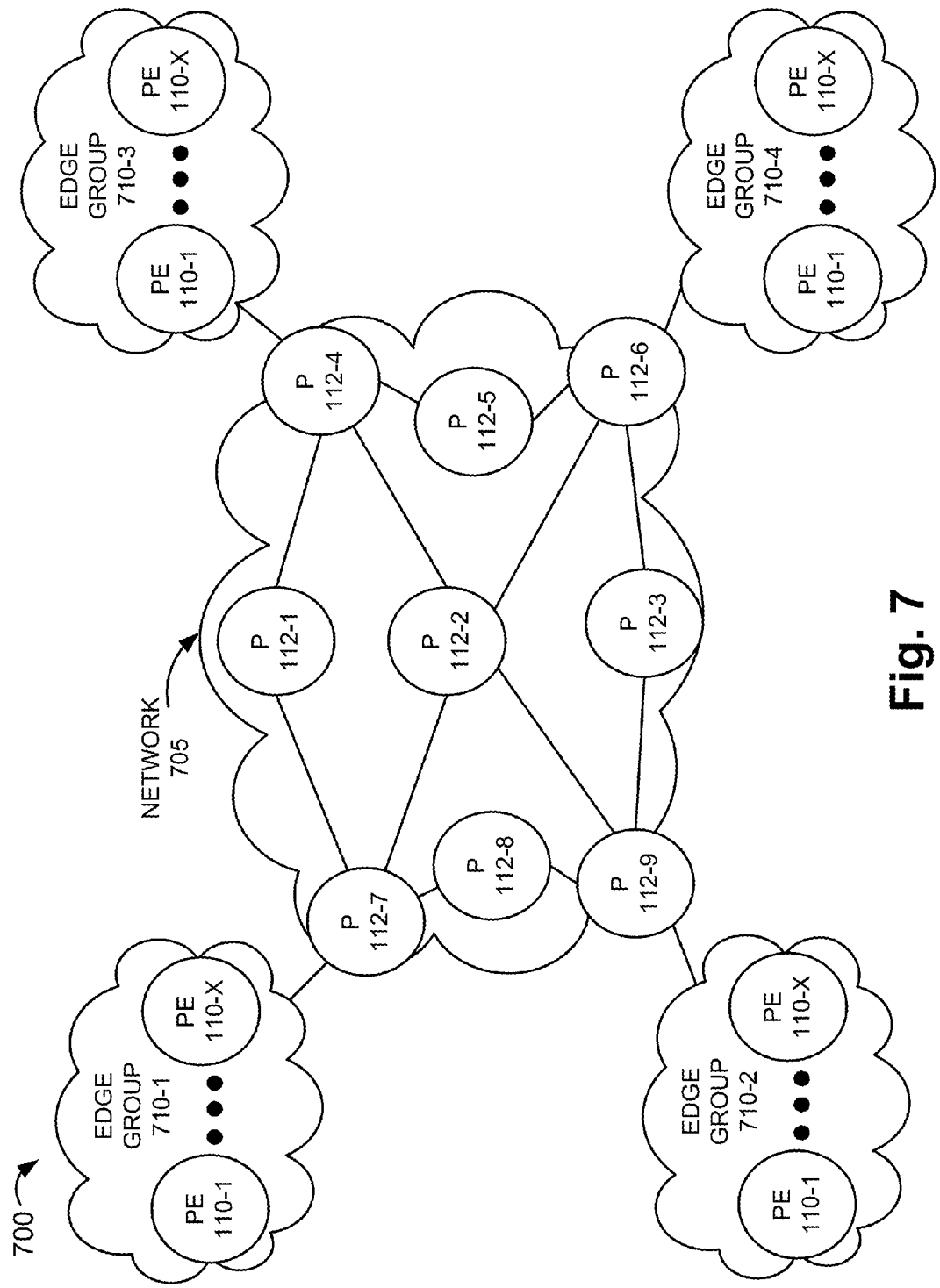
FIG. 7 is a diagram illustrating an exemplary environment in which an exemplary embodiment of an MPLS-based network with traffic flow distribution may be implemented.

FIG. 7 is a diagram illustrating another exemplary environment 700 in which an exemplary embodiment of an MPLS-based network with traffic flow distribution may be implemented. As illustrated, environment 700 includes a network 705 that includes provider devices 112-1 through 112-9. Environment 700 also includes edge groups 710-1 through 710-4 (also referred to collectively as edge groups 710 and individually as edge group 710) in which each edge group 710 includes provider edge devices 110-1 through 110-X, in which X>1. According to an exemplary implementation, edge groups 710 use LDP LSPs to forward traffic flows to network 705, and provider devices 112 use RSVP LSPs or RSVP-TE LSPs to forward LDP LSP traffic flows.

According to an exemplary embodiment, provider device 112 performs traffic flow distribution according to one or more embodiments described herein. For example, a traffic flow is received from provider edge device 110 (e.g., via an LDP LSP). Provider device 112 identifies a traffic flow and determines traffic flow information. Provider device 112 may use a threshold value for comparison and identifies one or multiple candidate LSP(s). Provider device 112 calculates current available bandwidth and selects one or multiple candidate LSP(s) to service the traffic flow based on the traffic flow information and the current available bandwidth.

The foregoing description of embodiments provides illustration, but is not intended to be exhaustive or to limit the embodiments to the precise form disclosed. Accordingly, modifications to the embodiments described herein may be possible. For example, as previously described, one or more embodiments described herein may be practiced in a PBB-TE-based network, a GMPLS-based network, or a Q-in-Q-based network.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware, a combination of hardware and software, a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
receiving, by a network device, packets;
determining, by the network device, a traffic flow rate value pertaining to the packets;
selecting, by the network device, one or more candidate paths;
calculating, by the network device, a current available bandwidth for each of the one or more candidate paths;
calculating, by the network device, a flow rate threshold value based on historical statistical data pertaining to traffic flows of the one or more candidate paths;
comparing, by the network device, the traffic flow rate value to the flow rate threshold value, wherein the comparing comprises determining whether the traffic flow rate value is greater than or equal to the flow rate threshold value;
selecting, by the network device, one or more of the one or more candidate paths based on the comparing and the current available bandwidth, wherein at least one of the one or more of the one or more candidate paths has a current available bandwidth below the flow rate threshold value, based on a result of the comparing that the traffic flow rate value is less than the flow rate threshold value; and
transmitting, by the network device, the packets to a destination via the one or more of the one or more candidate paths.

2. The method of claim 1, further comprising:
storing maximum bandwidth values for paths including the one or more candidate paths;
calculating a current bandwidth utilization for each of the one or more candidate paths; and
calculating the current available bandwidth for each of the one or more candidate paths based on a maximum bandwidth value and a current bandwidth utilization.

3. The method of claim 1, wherein the flow rate threshold value is a dynamic value.

4. The method of claim 1, further comprising:
collecting statistical information pertaining to the traffic flows.

5. The method of claim 1, wherein the
one or more candidate paths are one or more label switching paths.

6. The method of claim 1, wherein at least one of the one or more of the one or more candidate paths has a current available bandwidth equal to or above the flow rate threshold value, based on a result of the comparing that the traffic flow rate value is equal to or greater than the flow rate threshold value.

7. The method of claim 1, further comprising:
inspecting at least one of a label or a header included in one or more of the packets; and
identifying a traffic flow based on the inspecting.

8. A device comprising:
a communication interface;
a memory; and
logic configured to:
receive, via the communication interface, packets
determine a traffic flow rate value pertaining to the packets;
select one or more candidate paths;
calculate a current available bandwidth for each of the one or more candidate paths;
calculate a flow rate threshold value based on historical statistical data pertaining to traffic flows of the one or more candidate paths;
compare the traffic flow rate value to the flow rate threshold value;
determine whether the traffic flow rate value is greater than or equal to the flow rate threshold value based on a result of a comparison;
select one or more of the one or more candidate paths based on the current available bandwidth and result of the comparison between the traffic flow rate and the flow rate threshold value, wherein at least one of the one or more of the one or more candidate paths has a current available bandwidth below the flow rate threshold value, based on the result of the comparison that the traffic flow rate value is less than the flow rate threshold value; and transmit, via the communication interface, the packets to a destination via the one or more of the one or more candidate paths.

9. The device of claim 8, wherein the logic is further configured to:
store maximum bandwidth values for paths including the one or more candidate paths;
calculate a current bandwidth utilization for each of the one or more candidate paths; and
calculate the current available bandwidth for each of the one or more candidate paths based on a maximum bandwidth value and a current bandwidth utilization.

10. The device of claim 8, wherein the logic is further configured to:
collect statistical information pertaining to the traffic flows.

11. The device of claim 8,
wherein the one or more candidate paths are one or more label switching paths.

12. The device of claim 8, wherein at least one of the one or more of the one or more candidate paths has a current available bandwidth equal to or above the flow rate threshold value, if a result of the comparing is that the traffic flow rate value is equal to or greater than the flow rate threshold value.

13. The device of claim 8, wherein the flow rate threshold value is a dynamic value based on at least one of time or network state.

14. The device of claim 8, wherein the logic is further configured to:
identify a traffic flow pertaining to the packets.

15. The device of claim 8, wherein the device is a provider edge router.

16. A non-transitory storage medium storing instructions executable by a computational device to:
determine a traffic flow rate value pertaining to packets received by the computational device;
select one or more candidate label switching paths to forward the packets;
calculate a current available bandwidth for each of the one or more candidate label switching paths;
calculate a flow rate threshold value based on historical statistical data pertaining to traffic flows of the one or more candidate paths;
compare the traffic flow rate value to the flow rate threshold value;
determine whether the traffic flow rate value is greater than or equal to the flow rate threshold value based on a result of a comparison; and
select one or more of the one or more candidate label switching paths to transmit the packets based on the current available bandwidth and the result of the comparison between the traffic flow rate and the flow rate threshold value, wherein at least one of the one or more of the one or more candidate paths has a current available bandwidth below the flow rate threshold value, based on the result of the comparison that the traffic flow rate value is less than the flow rate threshold value.

17. A method comprising:
receiving, by a network device, packets;
determining, by the network device, a traffic flow rate value pertaining to the packets;
calculating a flow rate threshold value based on historical statistical data pertaining to traffic flows, wherein the flow rate threshold value is dynamic based on at least one of a time parameter or a network state parameter;
selecting, by the network device, one or more candidate paths;
calculating, by the network device, a current available bandwidth for each of the one or more candidate paths;
selecting, by the network device, one or more of the one or more candidate paths based on the traffic flow rate value and the current available bandwidth; and
transmitting, by the network device, the packets to a destination via the one or more of the one or more candidate paths.

18. The method of claim 17, further comprising:
comparing, by the network device, the traffic flow rate value to the flow rate threshold value.

19. The method of claim 18, wherein the selecting of the one or more of the one or more candidate paths is further based on a result of the comparing between the traffic flow rate value and the flow rate threshold value.

20. The method of claim 17, further comprising:
storing maximum bandwidth values for paths including the one or more candidate paths;
calculating a current bandwidth utilization for each of the one or more candidate paths; and
calculating the current available bandwidth for each of the one or more candidate paths based on a maximum bandwidth value and a current bandwidth utilization.

* * * * *